United States Patent [19]

Guido, Jr.

[11] 4,172,614

[45] Oct. 30, 1979

[54] TARPAULIN COVER FOR FREIGHT CARRIERS

[75] Inventor: Anthony L. Guido, Jr., Elma, N.Y.

[73] Assignee: Custom Canvas Manufacturing Co., Inc., Buffalo, N.Y.

[21] Appl. No.: 882,257

[22] Filed: Feb. 28, 1978

[51] Int. Cl.² .............................................. B60P 7/02
[52] U.S. Cl. .................................. 296/100; 105/377; 296/98
[58] Field of Search .................... 296/100, 98, 136; 105/377

[56] References Cited

U.S. PATENT DOCUMENTS

| | | | |
|---|---|---|---|
| 1,719,055 | 7/1929 | Herzer | 296/136 |
| 2,889,171 | 6/1959 | Morris | 296/100 |
| 3,044,653 | 7/1962 | Tantlinger | 296/100 |

Primary Examiner—Robert R. Song
Attorney, Agent, or Firm—Christel, Bean & Linihan

[57] ABSTRACT

A tarpaulin cover for open top freight carriers having another opening at one end closed by a pair of movable doors, the cover comprising a main body portion for covering the top of the carrier secured by ties to the carrier sides and a flap portion extending from the main body portion adjacent the other opening. The flap portion includes a pair of sections each extending into the opening and inwardly of a corresponding door when closed. Each section includes an enlargement defined by a stock member carried thereby which prevents the section from being pulled out when the door is closed. The two sections are separated by an opening therebetween, each section is of a dimension less than the width of the corresponding door, and each section preferably is rectangular in shape. The sections co-operate with the doors to hold that end of the tarpaulin cover to the carrier body without ties at that end and in a manner allowing easy opening and closing of the doors.

14 Claims, 6 Drawing Figures

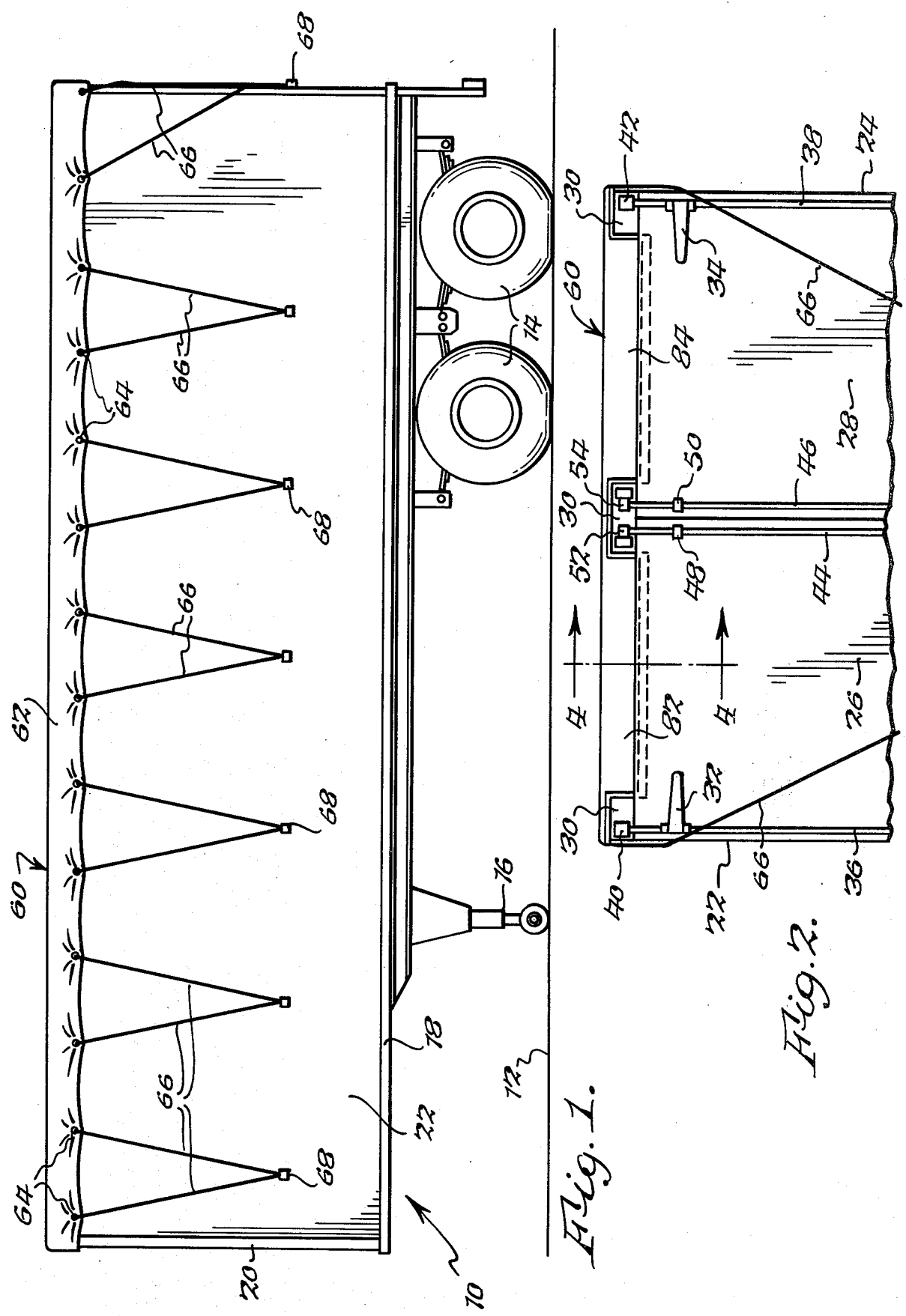

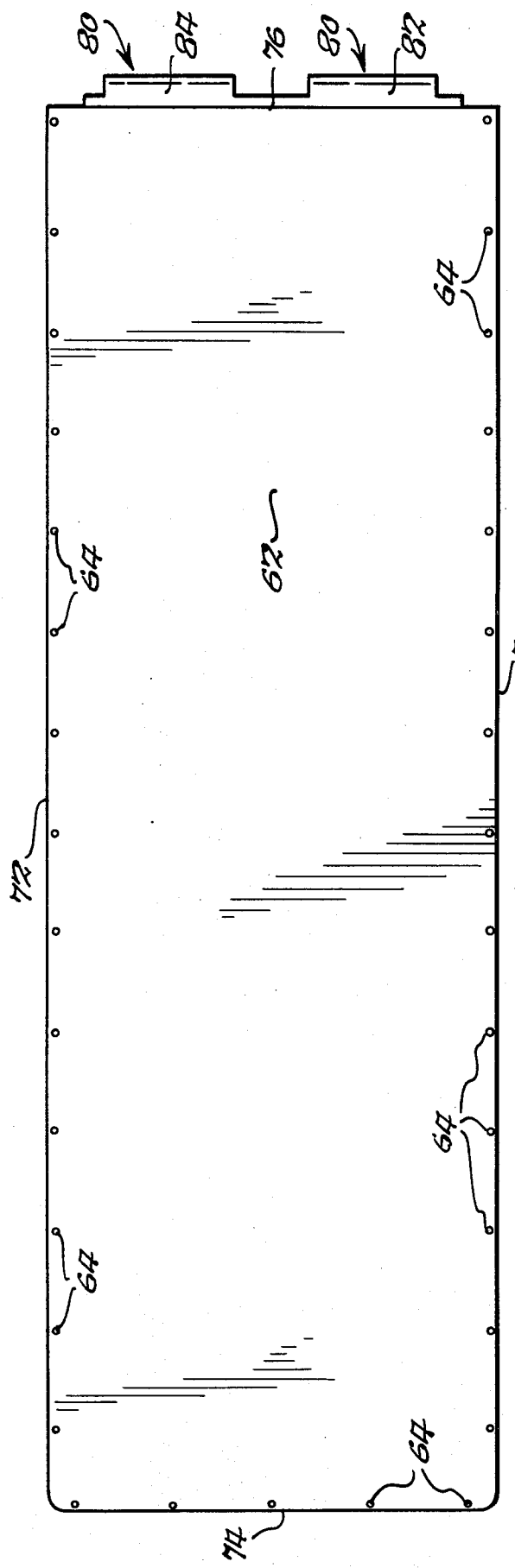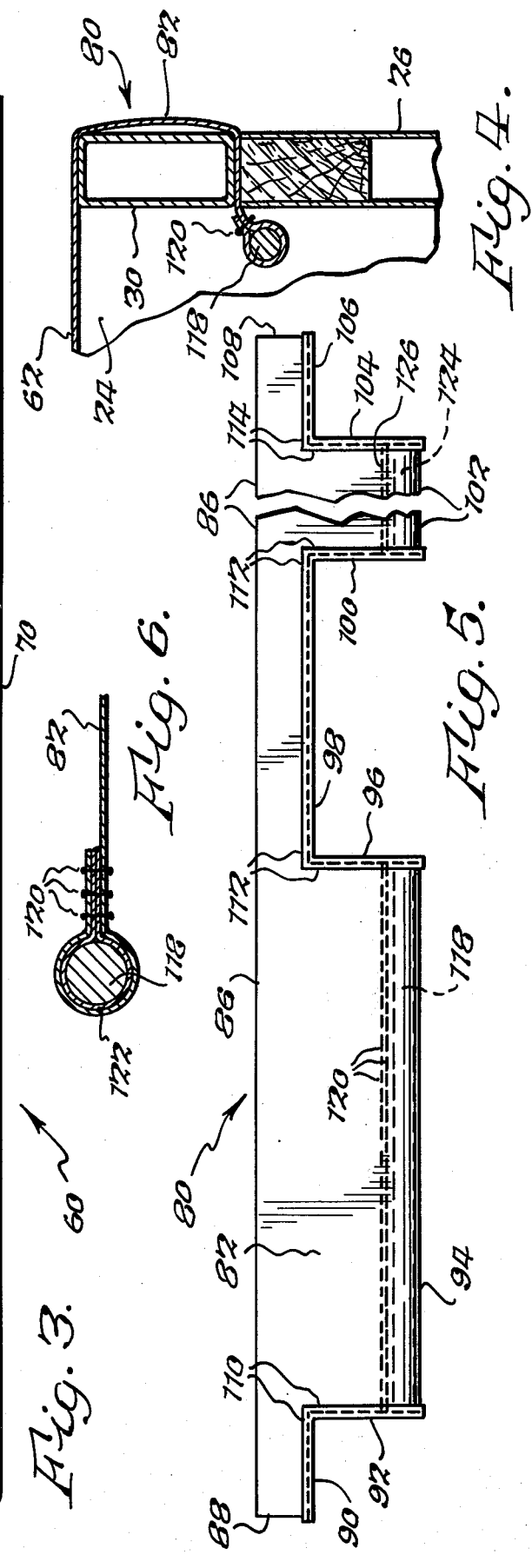

TARPAULIN COVER FOR FREIGHT CARRIERS

BACKGROUND OF THE INVENTION

This invention relates to the art of vehicle tops, and more particularly to a new and improved tarpaulin for open top freight carriers.

One area of use of the present invention is with open top land vehicles for hauling freight, although the principles of the present invention can be variously applied. In order to accommodate certain types of cargo including large, bulky and unwieldy items, freight carriers of the open top variety are provided wherein the cargo of the kind indicated is lowered into the carrier by a crane or the like through the open top whereupon the top is covered by a tarpaulin. The carrier includes another access opening, usually at the rear end thereof, which is closed by movable doors. It is necessary to secure the tarpaulin cover firmly to the body of the freight carrier to prevent the tarpaulin from being detached by wind and by air flow encountered during travel of the freight carrier.

Tarpaulin covers for freight carriers typically are of a size and shape extending across the open top of the carrier, and the covers often are secured in place by ties each fastened at one end to the cover and at the other end to the carrier body, this being done around all sides of the carrier body. The foregoing arrangement including ties on the rear end of the carrier can pose a problem with opening and closing the carrier rear doors and a safety hazard during attempts by persons to hold the tarpaulin while closing the doors.

SUMMARY OF THE INVENTION

It is, therefore, a primary object of this invention to provide a new and improved tarpaulin cover for open top freight carriers.

It is a further object of the present invention to provide such a tarpaulin cover which is adequately held down on the carrier body and at the same time does not interfere with opening and closing of doors on the carrier.

It is a further object of this invention to provide such a tarpaulin cover which is relatively simple in construction and convenient and easy to install.

It is a further object of this invention to provide such a tarpaulin cover which is relatively economical to manufacture.

The present invention provides a tarpaulin cover for open top freight carriers having another opening in a side closed by a pair of movable doors, the tarpaulin cover comprising a main body portion of a size adequate to cover the top of the carrier and a flap portion extending from the main body portion at a location adjacent the other opening. The flap portion includes a pair of separate sections each extending into the other opening and inwardly of a corresponding one of the doors. The sections are provided with means for holding them in place when the doors are in a closed position, in particular each of the sections includes an enlargement which prevents withdrawl of the section when the corresponding door is closed. The two sections are separated by an opening therebetween, each section is of a dimension less than the width of the corresponding door and each section preferably is rectangular in shape. The sections co-operate with the doors to hold the portion of the tarpaulin adjacent the sections to the carrier body in a manner allowing easy opening and closing of the doors.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a side elevational view of an open top freight carrier vehicle provided with a tarpaulin cover according to the present invention;

FIG. 2 is a fragmentary rear end elevational view of the carrier of FIG. 1;

FIG. 3 is a plan view of the tarpaulin cover according to the present invention;

FIG. 4 is an enlarged sectional view taken about on line 4—4 in FIG. 2;

FIG. 5 is an enlarged fragmentary plan view of the extending flap portion of the tarpaulin of the present invention; and FIG. 6 is an enlarged fragmentary cross-sectional view of one of the sections of the flap portion of the tarpaulin of the present invention.

DETAILED DESCRIPTION OF THE ILLUSTRATED EMBODIMENT

In basic tarpaulin covers for open top freight carriers, the tarpaulin extends over across the top of the carrier and is held in place on the carrier body by ties fastened at one end to the tarpaulin and at the other end to the carrier body. In accordance with the present invention, there is provided a tarpaulin cover for open top carriers and having a main body portion of a size adequate to cover the top opening of the carrier and a flap portion extending from the main body portion at a location adjacent another opening in the carrier, typically at the rear end thereof, which opening is closed by movable access doors. The flap portion includes a pair of separate sections each extending into the opening and inwardly of a corresponding one of the doors. The sections are provided with means for holding the sections in place when the doors are in a closed position, in particular an enlargement is included on each of the flap sections for preventing the flap portions from being pulled out when the doors are closed. Each enlargement is defined by a stock member carried by the corresponding flap section adjacent the outer end thereof. The flap sections are separated by an open region therebetween, each section is of a length less than the width of the corresponding door, and each section is of rectangular shape. The flap sections co-operate with the doors to hold that end of the tarpaulin cover to the carrier body without ties at that end and in a manner allowing unimpeded opening and closing movements of the doors.

Referring now to FIG. 1, a freight carrier in the form of a truck trailer 10 is shown resting in a stationary condition on a supporting surface 12 such as a road or the ground. Trailer 10 includes a pair of rear wheels 14 rotatably connected to a frame and a front rest or support post 16 extending from the frame. Trailer 10 further includes a body defined by a base or floor 18, a front end wall 20, and a pair of side walls 22, 24. The rear end of the trailer includes a pair of movable doors 26, 28 as shown in FIG. 2. The doors are movable between positions opening and closing a rear end access opening defined by the rear edges of floor 18 and side walls 22, 24 and a top frame member 30 extending perpendicular to each of the side walls. The doors 26, 28 when closed are disposed in the plane of the opening with the inner vertical edges of the doors in close facing relation, the upper horizontal edges spaced close to the lower horizontal surface of frame member 30, the outer vertical edges substantially flush with the outer surfaces of the corresponding side walls, and the lower horizontal edges spaced close to the floor. Each door is mounted for movement to an open position wherein the door is disposed outwardly at an angle to the plane of the opening. A pair of upper hinges 32 and 34 are mounted to corresponding ones of the doors and are connected to vertical shafts 36 and 38, respectively, which in turn are pivotally connected at the upper ends to frame 30 by means of fittings 40 and 42, respectively. The shafts also are connected to a pair of lower hinges (not shown). The doors are locked in a closed position by means of a pair of reciprocable rods 44 and 46 extending through holders 48 and 50, respectively in the doors and movable into and out of receptacles 52 and 54, respectively, fixed to frame 30.

Carrier 10 has an open top which is closed by a tarpaulin cover 60 according to the present invention. Cover 60 includes a main body portion 62 of a size adequate to cover the open top of carrier 10, and in the tarpaulin cover shown the main body portion is rectangular having a length several times greater than the width thereof. The length and width of body 62 are greater than corresponding dimensions of the open top of carrier 10 such that the tarpaulin cover extends downwardly along side walls 22, 24 and front end wall 20 a relatively small distance as shown in FIGS. 1 and 2. The marginal peripheral portion of tarpaulin cover 60 which contacts the carrier end and side walls aids in sealing and enclosing the carrier interior from environmental conditions such as rain and also prevents wind and high speed air currents from flowing under the tarpaulin cover during travel of the carrier. The cover 60 can be secured or attached to the body of carrier 10 by various suitable arrangements, and the cover shown is provided with a plurality of eyelets or openings 64 spaced at substantially regular intervals along the two side edges and the front end edge which co-operate with a plurality of tie ropes or cords 66 and hooks or brackets 68 spaced along the side walls 22, 24 and front end wall 20 of the body of carrier 10. In the carrier shown the brackets 68 are located slightly below the mid-point along the height of the corresponding carrier wall, and a pair of eyelets 64 is connected by lines 66 to a single hook 68. The lines 66 are drawn or pulled tight so that the marginal portion of cover body 62 is in tight contact with the outer surface of the carrier wall.

FIG. 3 illustrates the tarpaulin cover 60 in further detail, the main body portion 62 being defined by the substantially parallel side edges 70, 72 which are of considerable length and which meet the front end edge 74 at substantially right angles, the corner junctions being slightly curved. Eyelets 64 are located relatively close to the edges 70, 72 and 74 and are spaced at substantially equal internals therealong. The tarpaulin cover shown also has an opposite or rear end defined by an edge 76 which is disposed substantially parallel to front edge 74 and meets side edges 70, 72 at substantially right angles.

In accordance with the present invention, the tarpaulin cover 60 includes a flap portion 80 extending from main body portion 62 at a location such that flap portion 80 is adjacent the other opening in the carrier body. In the tarpaulin cover shown, flap portion 80 extends from the rear end portion of body 62, in particular from edge 76, so as to be located adjacent the carrier rear end access opening containing doors 26, 28. Flap portion 80 includes a pair of separate sections 82 and 84 each extending into the opening and inwardly of the corresponding doors 26 and 28, respectively, as shown in FIG. 2. The sections 82 and 84 are provided with means for holding or maintaining the position of the sections relative to doors 26, 28 in a manner which will be described in further detail presently.

The flap portion 80 is shown in more detail in FIG. 5 and includes an edge 86 which extends along the entire length thereof. Typically, the main body portion 62 of tarpaulin cover 60 comprises a single thickness of fabric, for example a vinyl-coated Nylon fabric, and flap portion 80 comprises a plurality of thicknesses of fabric, usually the same fabric as that of body portion 62, and thus edge 86 defines the junction between the different thicknesses. Of course, the body portion 62 and flap portion 80 could be of the same thickness if desired. As shown in FIGS. 3 and 5, the flap sections 82, 84 are separated by an open region therebetween, each flap section 82, 84 terminates inwardly of the outer end of flap portion 80 and, as shown in FIG. 3, each flap section 82 and 84 is of a length less than the width of the corresponding one of doors 26 and 28, respectively. In particular, portion 80 includes an edge 88 at the far left-hand end as viewed in FIG. 5 which extends at substantially a right angle from edge 86 for a relatively short distance whereupon it meets an edge 90 which extends at substantially a right angle inwardly for a relatively short distance and substantially parallel to edge 86. Flap section 82 is defined by a first edge 92 which extends at substantially a right angle to edge 90 in an outward direction relative to edge 86 and generally parallel to edge 88, a second edge 94 extending at substantially a right angle to edge 92 in a direction substantially parallel to edge 86 in a direction inwardly away from the outer end 88, and a third edge 96 extending at substantially a right angle from edge 94 in a direction inwardly toward edge 86 and substantially parallel to edge 92. Flap section 82 thus is substantially rectangular in shape, and the length of flap section 82 measured between edges 92 and 96 is a number of times greater than the width thereof.

Edge 96 is of substantially the same length as edge 92 and terminates at a location spaced from edge 86 where it meets an edge 98 at substantially a right angle. Edge 98 extends in a direction away from flap section 82 and substantially parallel to edge 86. Edge 98 meets the second flap section 84 which is defined by a first edge 100 which extends at substantially a right angle to edge 98 in an outward direction relative to edge 86 and generally parallel to edges 92, 96 of flap section 82, a second edge 102 extending at substantially a right angle to edge 100 in a direction substantially parallel to edge 86 and away from flap section 82, and a third edge 104 extending at substantially a right angle from edge 102 in a direction inwardly toward edge 86 and substantially parallel to edge 100. Flap section 84 thus is substantially rectangular in shape, and the length of flap section 84 measured between edges 100 and 104 is a number of times greater than the width thereof. As shown in FIGS. 2 and 3, flap sections 82, 84 are substantially equal in shape and size, and are separated by an open space bordered by the edges 96, 98 and 100.

The flap portion 80 further includes an edge 106 which extends at substantially a right angle from edge 104 and in a direction parallel to edge 86 and away from flap section 84. Edge 106 meets an outer end edge 108 at substantially a right angle, the edge 108 being disposed substantially parallel to edge 88 and meeting edge 86 at substantially a right angle. Various edges of flap portion 80 are reinforced by relatively narrow fabric reinforcing strips or webbing folded over the edge to be reinforced and stitched or otherwise secured thereto. In particular, edges 90, 92 are provided with webbing 110, edges 96, 98 and 100 with webbing 112, and edges 104, 106 with webbing 114.

The tarpaulin cover flap portion 80 of the present invention further comprises means for holding or maintaining the flap sections 82, 84 in position relative to doors 26, 28, in particular inwardly of doors 26, 28 when closed. This is accomplished by an enlargement defined on each flap section 82 and 84 along the outer longitudinal edge 94 and 102, respectively. The enlargement is of a size sufficient to prevent withdrawl of the flap section out through the space or clearance between the adjacent surfaces of frame member 30 and the corresponding one of the doors 26, 28. In the tarpaulin cover shown, the enlargement extends along the entire length of each flap section 82 and 84 adjacent the edges 94 and 102, respectively. The enlargement preferably is provided by a stock member carried adjacent each edge 94, 102 and being held by folding or wrapping the fabric of the section around about the stock member and then stitching or securing the folded portion to the main portion of the section. The stock member can be of various suitable forms, such as a length of rope, rubber hose, pipe, plastic or wooden rod, etc. Thus, a stock member 118 is carried by flap section 82 along edge 94, the fabric of section 82 being wrapped around stock member 118 and secured by stitching designated 120. As shown in detail in FIG. 6, stock member 118 can be contained within a sheet 122 of suitable material, for example the same material as section 82, with lapped ends sandwiched between the main body of section 82 and the folded or wrapped back portion, the four sheets or layers being secured together by the stitching 120. Likewise, a stock member 124 is carried by section 84 adjacent edge 102, being held therein by an identical arrangement including stitching 126.

By way of example, in an illustrative tarpaulin cover, the overall length of flap portion 80 measured along edge 86 is about eight feet and one inch, and the overall width of flap portion 80 measured perpendicular from edge 86 either to edge 94 or to edge 102 is about nine inches. Each edge 88 and 108 has a length of about two and one-half inches, each edge 90 and 106 has a length of about six inches and edge 98 has a length of about eighteen inches. Stock members 118 and 124 each typically has a diameter of about one inch.

In making the tarpaulin cover, main body portion 62 and flap portion 80 can be integral in which case the cover is cut out from a single piece or sheet of material. The flap sections 82, 84 would be cut overwidth by an amount sufficient to extend around the corresponding stock member as shown in FIG. 6 and then return along the section to allow for secure fastening. If desired, the return portion could extend along the entire width of the section and stitched or otherwise secured to provide a section of double thickness of laminated construction for added strength. Alternatively, the flap section 80 containing sections 82 and 84 and corresponding enlargements defined by stock members 118 and 124, respectively, could be made separately and then fixed to the tarpaulin main body 62. This would be done, for example, by stitching or otherwise securely fastening edge 86 of flap portion 80 along edge 76 of main body portion 62. In either case while vinyl coated Nylon is preferred as a material for body portion 62 and flap portion 80, other suitable materials can of course be employed.

In use, the tarpaulin cover 60 is installed on carrier 10, and one method of installaton begins with cover 60 rolled or folded along the length thereof with the flap section 80 inside the bundle or package and edge 74 being externally accessible. The folded or rolled up cover is placed across the open top of carrier 10 adjacent front end 20, i.e. the left-hand end as viewed in FIG. 1, and the eyelets 64 along edge 74 are connected by tie cords to brackets on front end 20. The ties are pulled sufficiently tight so that a marginal portion of body 62 extends down along and in firm contact with the outer surface of end 20 as shown in FIG. 1. The bundle then is rolled rearwardly or to the right as viewed in FIG. 1 along the open top of carrier 10 with the marginal portions adjacent the side edges 70 and 72 extending downwardly a short distance along the carrier side walls 22 and 24, respectively. The tie lines 66 are fastened to connect the eyelets 64 along the edges 70 and 72 to the hooks or brackets 68 along the side walls 22 and 24, respectively, the ties being drawn sufficiently tight so that the main body portion 62 is taut across the carrier top and so that the marginal portions are in close tight contact with the upper outer surface portions of the side walls 22, 24.

The rear doors 26, 28 then are opened by an amount sufficient to allow the flap portion 80 to lie flat along the rear end surface of frame member 30 and the flap sections 82, 84 to extend generally vertically downwardly therefrom. In this condition the inner surfaces of the doors 26 and 28 are located outwardly of the flap sections 82 and 84, respectively, relative to the rear end opening in the carrier body. When the doors are closed, the flap sections 82 and 84 extend into the opening and interior of the carrier behind or inwardly of the doors 26 and 28, respectively, as shown in FIG. 2. In particular, each flap section, for example section 82, extends downwardly along the outer surface of frame member 30 as shown in FIG. 4 and then inwardly between the lower outer surface of frame member 30 and upper surface of door 26. The end of the flap section containing the stock member, for example stock member 118, is located in the interior of the carrier body, closely adjacent the inner surfaces of frame member 30 and the corresponding door, for example door 26. The space or clearance between the lower surface of frame member 30 and the upper surface of each door 26, 28 is sufficient to accommodate the thickness of the corresponding flap section 82, 84. The corresponding stock member is of a cross-sectional size such that it cannot pass through the clearance when the door is closed, even in response to an outwardly directed pulling or drawing force created by wind or air currents acting on the remainder of the tarpaulin. As a result, the end of tarpaulin cover 60 containing flap 80 and sections 82, 84 is held firmly and securely to the carrier body when doors 26, 28 are closed. The doors can be opened at any time when desired with no interference by flap sections 82, 84.

When a door is opened, the corresponding flap section simply hangs in a generally vertical disposition along the upper portion of the opening. When the door is reclosed, the flap section simply is returned to the position illustrated in FIGS. 2 and 4. The foregoing operation occurs solely due to co-operation between each flap section and the corresponding door and there is no need for any external manipulation by the human operator of the portion 80 or flap sections 82, 84.

Thus, the flap portion 80 including sections 82, 84 functions to hold down the tarpaulin cover 60 to the carrier body securely and in a manner which does not interfere with opening and closing of access doors on a side or end of the carrier body. There is no need to provide any straps, snaps, eyelets or like fasteners on flap portion 80 or the adjacent portion of tarpaulin body 62. The carrier doors simply close onto the tail-like formation of flap portion 80 and the sections 82, 84 and this holds the end of the tarpaulin in place. The sections 82, 84 cannot slip out or be pulled out so long as the doors are closed due to the enlargement on each section 82, 84 defined by the stock members carried thereby. The enlargements are of a size preventing them from passing between the adjacent facing surfaces of frame member 30 and doors 26, 28. The foregoing is provided in a tarpaulin cover which is relatively simple in construction and economical to manufacture and which is convenient and easy to install and use.

While the present invention has been described in connection with an open top carrier having an elongated rectangular body with access doors at the rear end, the invention is applicable to tarpaulin covers for a wide variety of open top carriers. This would include, in addition to a highway truck trailer as shown in FIG. 1, open top freight containers adapted to be mounted on a highway truck trailer chassis, railway flat car or the like and which also can be detached therefrom and stored in or on a ship for marine transportation. Also, for any carrier body having a single side or end access door, flap portion 80 could contain a single section having means in the form of an enlargement defined by a stock member carried thereby co-operating with the door to hold or maintain the single section in place when the door is closed similar to the manner in which each section 82 and 84 co-operates with the corresponding door 26 and 28.

It is therefore apparent that the present invention accomplishes its intended objects. While a single embodiment of the present invention has been described in detail, this is for the purpose of illustration, not limitation.

I claim:

1. A tarpaulin for covering an opening in the body of a carrier wherein said opening leads to the interior of said carrier, another opening in said carrier is located near said first-named opening, and at least one door is associated with said other opening and is movably mounted on said body for movement between open and closed positions, each door being disposed substantially in the plane of said other opening when in a closed position, said tarpaulin comprising:
   (a) a main body portion having a size adequate to cover said first-named opening, said main body portion having a peripheral edge and a plurality of elements at spaced locations along said edge for co-operating with fastening means on said carrier body to place the portion of said tarpaulin main body portion adjacent said peripheral edge in firm contact with said carrier body; and
   (b) a flap portion extending from said main body portion at a location so as to be adjacent said other opening, said flap portion including at least one section of a shape and size for extending into said other opening and inwardly of a corresponding door, the dimension of said flap in the direction extending from said main body portion being a number of times smaller than the dimension of said flap measured substantially perpendicular to said first-named dimension, said section including means for maintaining the position of said section relative to the corresponding door when the door is closed.

2. A tarpaulin according to claim 1, wherein said position maintaining means comprises an enlargement on said section located inwardly of the door when the door is closed, said enlargement being of a size sufficient to prevent withdrawl of said section when the door is closed.

3. A tarpaulin according to claim 1, wherein said flap portion includes a pair of separate sections each of a shape and size for extending into said other opening and inwardly of a corresponding one of a pair of doors associated with said other opening, each of said sections including means for maintaining the position of said section relative to the corresponding door when the door is closed.

4. A tarpaulin according to claim 3, wherein each of said position maintaining means comprises an enlargement on said section located inwardly of the corresponding one of said doors when the door is closed, said enlargement being of a size sufficient to prevent withdrawl of said section when the door is closed.

5. A tarpaulin according to claim 3, wherein each of said flap sections is of a dimension less than the width of the corresponding door.

6. A tarpaulin according to claim 3, wherein each of said flap sections is rectangular in shape.

7. A flap member adapted to be attached to a tarpaulin wherein the tarpaulin covers an opening in the body of a carrier which opening leads to the interior of the carrier, another opening in the carrier is located near the first-named opening, and at least one door is associated with the other opening and is movably mounted on the body for movement between open and closed positions, each door being disposed substantially in the plane of the other opening when in a closed position, said flap member comprising a body of flexible material having an edge and adapted to be attached to the tarpaulin along said edge of said flap member body and at a location so as to be adjacent the other opening, said flap member including at least one section of a shape and size for extending into the other opening and inwardly of a corresponding door, said section having a dimension measured substantially parallel to said flap member body which is a number of times larger than the dimension of said section measured substantially perpendicular to said first-named dimension, said section including means for maintaining the position of said section relative to the corresponding door when the door is closed.

8. A tarpaulin flap according to claim 7, wherein said position maintaining means comprises an enlargement on said section located inwardly of the door when the door is closed, said enlargement being of a size sufficient to prevent withdrawl of said section when the door is closed.

9. A tarpaulin flap according to claim 7, wherein said flap member includes a pair of separate sections each of a shape and size for extending into said other opening and inwardly of a corresponding one of a pair of doors associated with said other opening, each of said sections including means for maintaining the position of said section relative to the corresponding door when the door is closed.

10. A tarpaulin flap according to claim 9, wherein each of said position maintaing means comprises an enlargement on said section located inwardly of the corresponding one of said doors when the door is closed, said enlargement being of a size sufficient to prevent withdrawl of said section when the door is closed.

11. A tarpaulin flap according to claim 9, wherein said flap sections are separated by an open region therebetween.

12. A tarpaulin for covering an opening in the body of a carrier wherein said opening leads to the interior of said carrier, another opening in said carrier is located near said first-named opening, and at least one door is associated with said other opening and is movably mounted on said body for movement between open and closed positions, each door being disposed substantially in the plane of said other opening when in a closed position, said tarpaulin comprising:
 (a) a main body portion having a size adequate to cover said first-named opening; and
 (b) a flap portion extending from said main body portion at a location so as to be adjacent said other opening, said flap portion including a pair of separate sections each of a shape and size for extending into said other opening and inwardly of a corresponding one of a pair of doors associated with said other opening, each of said sections including means for maintaining the position of said section relative to the corresponding door when the door is closed, said flap sections being separated by an open region therebetween.

13. A tarpaulin according to claim 12, wherein said main body portion has a peripheral edge and a plurality of elements at spaced locations along said edge for cooperating with fastening means on said carrier body to place the portion of said tarpaulin main body portion adjacent said peripheral edge in film contact with said carrier body.

14. A tarpaulin according to claim 12, wherein each of said position maintaining means comprises an enlargement on said section located inwardly of the corresponding one of said doors when the door is closed, said enlargement being of a size sufficient to prevent withdrawal of said section when the door is closed.

* * * * *